UNITED STATES PATENT OFFICE.

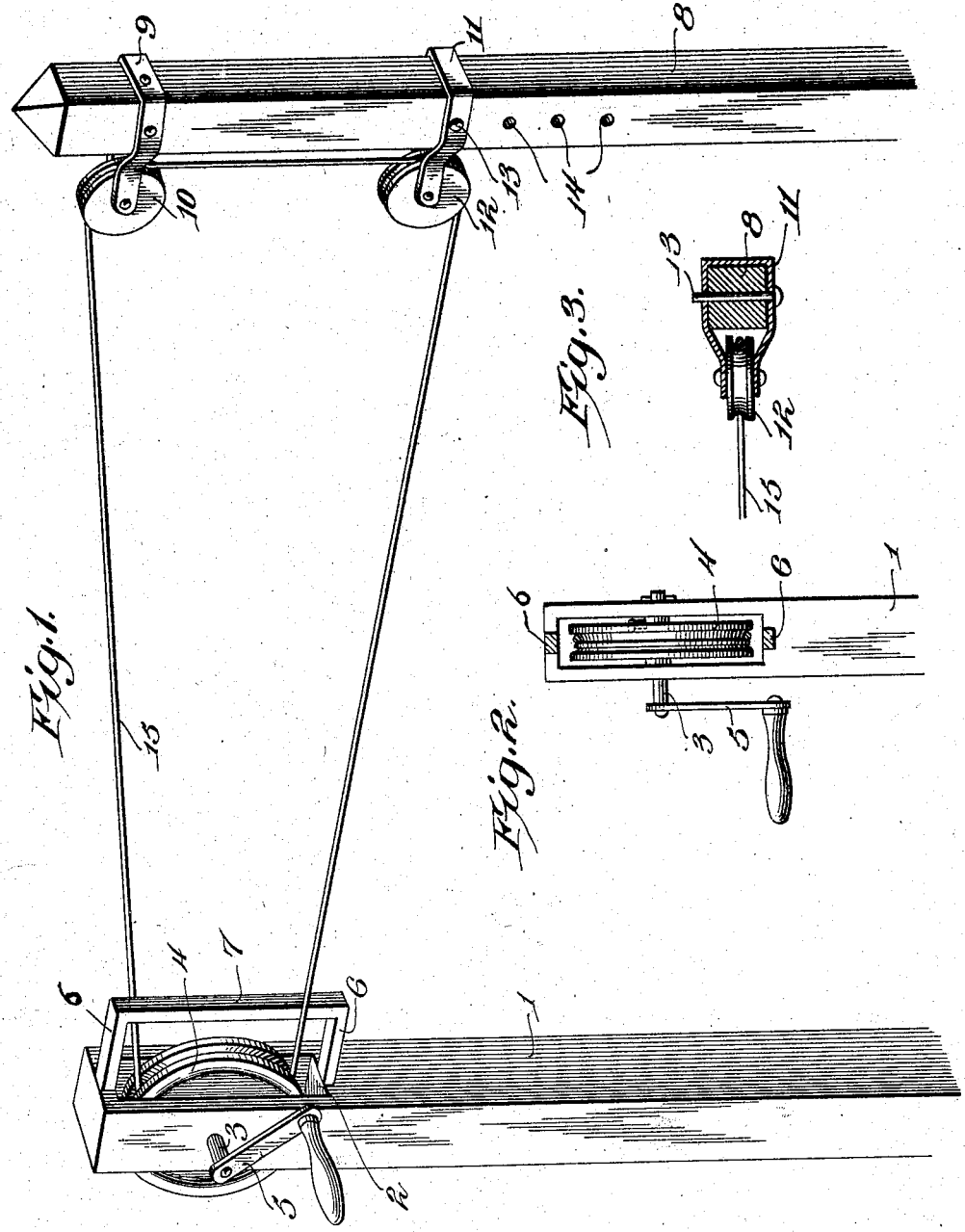

JOHN HATCH HARTLEY, OF WHITEOAK, MISSOURI.

CLOTHES-LINE SUPPORT.

No. 815,529.

Specification of Letters Patent.

Patented March 20, 1906.

Application filed July 18, 1905. Serial No. 270,208.

*To all whom it may concern:*

Be it known that I, JOHN HATCH HARTLEY, a citizen of the United States, residing at Whiteoak, in the county of Dunklin and State of Missouri, have invented certain new and useful Improvements in Clothes-Line Supports; and I do hereby declare the following to be a full, clear, and exact description of the invention, such as will enable others skilled in the art to which it appertains to make and use the same.

My invention relates to clothes-line apparatus; and its object is to provide an endless line having suitable supports therefor, one of which can be adjusted to take up any slack in the line.

Another object is to provide a line-operating wheel having means whereby the line is prevented from overlapping upon the wheel during the operation of rotating said wheel.

With the above and other objects in view the invention consists of suitably-disposed poles, one of which is provided with an adjustable pulley disposed below a fixed pulley, and these two pulleys are adapted to support an endless line, which may be of wire or fiber and which is wrapped once around an operating-wheel journaled in the other pole. A guide-strip is interposed between the upper and lower portions of the line close to the operating-wheel, so as to prevent the line from overlapping upon said wheel during the rotation thereof.

The invention also consists in further novel construction and combination of parts hereinafter more fully described and claimed.

In the accompanying drawings I have shown the preferred form of my invention.

In said drawings, Figure 1 is a perspective view of the apparatus. Fig. 2 is a front elevation of the operating-wheel and the parts adjacent thereto, the guide-strip being removed; and Fig. 3 is a transverse section through the adjustable pulley and its post.

Referring to the figures by numerals of reference, 1 is the main post of the apparatus, the same being preferably provided with a large aperture 2, through which extends the shaft 3, having a grooved wheel 4, keyed or otherwise secured to it and located within the aperture 2. This shaft and wheel are adapted to be rotated by means of a crank 5, connected to one end of the shaft. Arms 6 extend from the ends of the aperture 2 and are connected by a guide-strip 7, which is disposed directly in front of the groove in the wheel 4. Another post 8 is located any suitable distance from the post 1 and has a strap 9 fastened thereto near its upper end and provided with the grooved pulley 10. Another strap 11 surrounds the post 8 and has a pulley 12 journaled to it. This last-mentioned strap, however, is permanently connected to the post, but is adapted to be fastened at any desired point thereto by means of a pin 13, which may be placed within any one of a series of apertures 14 formed in the post.

An endless line 15, formed of wire or fibrous material, is mounted upon the pulleys 10 and 12 and is wrapped once around the wheel 4. The strip 7 extends between the upper and lower portions of the line, as shown in Fig. 1, and serves to prevent the coils upon the wheel 4 from overlapping during the operation of rotating said wheel. By adjusting the pulley 12 downward the line can be tightened. By fastening clothes to one portion of the line close to the wheel 4 and then rotating said wheel in one direction the line can be moved longitudinally, so as to carry the clothes therewith, and this operation can be continued until the entire upper or lower portion of the line is filled with clothes.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

In a clothes-line apparatus the combination with a post having fixed and adjustable pulleys connected thereto, one above the other; of an apetured main post, a grooved wheel rotatably mounted within the aperture, arms extending from the post, a guide-strip connecting the arms and in front of and alining with the operating-wheel, and an endless line mounted upon the pulleys and wound upon the wheel, the opposite portions of the line being disposed at opposite sides of the guide-strip.

In testimony whereof I have signed my name to this specification in the presence of two subscribing witnesses.

JOHN HATCH HARTLEY.

Witnesses:
   J. W. DAVIS,
   JOHN L. MCALISTER.